(12) United States Patent
Ishioka et al.

(10) Patent No.: US 6,552,991 B1
(45) Date of Patent: Apr. 22, 2003

(54) MICRO MIRROR APPARATUS AND OPTICAL MEMORY DISK APPARATUS

(75) Inventors: Koji Ishioka, Kanagawa; Hiroto Ido, Chiba; Naoto Kojima, Kanagawa; Kazuhito Hori, Kanagawa; Masaki Hara, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 09/692,258

(22) Filed: Oct. 19, 2000

(30) Foreign Application Priority Data

Oct. 19, 1999 (JP) ............................................. 11-297297

(51) Int. Cl.⁷ ................................................ G11B 7/00
(52) U.S. Cl. ................... 369/112.29; 359/224
(58) Field of Search ........................... 369/112.29, 119; 359/290, 291, 221, 224; 385/18

(56) References Cited

U.S. PATENT DOCUMENTS 6,137,926 A * 10/2000 Maynard ...................... 385/18
6,181,460 B1 * 1/2001 Tran et al. ................... 359/224
6,360,035 B1 * 3/2002 Hurst, Jr. et al. ............. 385/18

* cited by examiner

Primary Examiner—Paul W. Huber
(74) Attorney, Agent, or Firm—Robert J. Depke; Holland & Knight LLC

(57) ABSTRACT

In a micro mirror apparatus pivoting on a hinge part as its axis, a movable part connected to a stationary part through the hinge part enhances exclusively the flexural rigidity of the hinge part without causing any significant change in the torsional rigidity of the hinge part and thus widens servo band. To this end, on at least a part of the hinge part 14, a protrusion 14b protruding in the direction of its thickness is formed. This greatly increases the flexural rigidity of the hinge part 14 and widens the servo band.

9 Claims, 13 Drawing Sheets

MICRO MIRROR APPARATUS AND OPTICAL MEMORY DISK APPARATUS

RELATED APPLICATION DATA

The present application claims priority to Japanese Applications No. P11-297297 filed Oct. 19, 1999, which application is incorporated herein by reference to the extent permitted by law.

BACKGROUND OF THE INVENTION

1. Field of the Invention

This invention relates to a micro mirror apparatus which is a sub-component consisting of a small mirror and an optical disk apparatus used as a jogging actuator to serve as a tracking servo mechanism for this micro mirror.

2. Description of Related Art

In recent years in the field of electric machinery, technologies related to the semi-conductor manufacturing process are frequently applied to develop a technology called MEMS (Micro Electro Mechanical System) designed to miniaturize various mechanical elements.

Mechanical elements miniaturized by such MEMS technology are called micro-mechanical devices. Among them a device in which a mirror as a mechanical element designed to reflect light is miniaturized is a micro mirror apparatus.

As a micro mirror apparatus, one comprising a stationary part and a movable part having a reflecting surface all of which are joined together by at least a hinge part has already been developed. On the movable part on the opposite side of the reflecting surface, a part that functions for example as an electrode for an Al film is provided. And on the stationary part, at a position opposite through an air gap to a part that functions as an electrode for the movable part a pair of electrodes for Al films are provided.

This micro mirror apparatus alternatively applies different signal voltages to a pair of electrodes on Al films provided on the stationary part and creates alternatively opposite electrostatic force between this pair of electrodes and the part that functions as an electrode provided on the movable part to deform by torsion a hinge part and pivot the movable part on this hinge part as its axis, so that the reflecting surface formed on the movable part may incline in optional directions.

Incidentally, in recent years a technology has been proposed for using a micro mirror apparatus of the above-mentioned construction as a jogging actuator to serve as a tracking servo mechanism of the optical disk apparatus. In order to enable this micro mirror apparatus to demonstrate an outstanding performance as a jogging actuator of optical disks, it is desirable that the micro mirror has a vibration characteristic in that the primary natural frequency and the secondary natural frequency are far apart, in other word the servo band is wide.

In the micro mirror apparatus of the above-mentioned construction, the vibration mode shape and natural frequency result from the construction of the hinge part. To be more specific, the primary natural frequency that causes the movable part to pivot in the primary vibration mode results from the torsional rigidity of the hinge part, and the secondary natural frequency that causes the out-of-plane vibrations of the movable part in the secondary vibration mode results from the flexural rigidity of the hinge part.

Therefore, in the micro mirror apparatus of the above-mentioned construction, in order to separate the primary natural frequency and the secondary natural frequency and to widen the servo band, it is effective to enhance only the flexural rigidity of the hinge part without causing any change in the torsional rigidity of the hinge part.

However, the torsional rigidity and flexural rigidity of the hinge part are dependent each other, and particularly when the hinge part has a rectangular or square cross section, the degree of such dependency is high. Therefore, when the hinge part has a rectangular or square cross section, any attempt to enhance the flexural rigidity of the hinge part automatically results in a higher torsional rigidity of the hinge part, and it is difficult to widen the servo band of the micro mirror apparatus.

SUMMARY OF THE INVENTION

It is therefore an object of the present invention to provide a micro mirror apparatus having a widened servo band.

It is another object of the present invention to provide an optical disk apparatus in which this micro mirror apparatus is used as a jogging actuator.

The micro mirror apparatus according to the present invention is a micro mirror apparatus including a stationary part, a movable part connected to the stationary part through a hinge part, and a reflecting surface formed on the movable part, the movable part pivoting on the hinge part as its axis by torsional deformation of the hinge part, wherein on at least a part of the hinge part a protrusion protruding in the direction of its thickness is formed.

In this micro mirror apparatus, the formation of a protrusion protruding in the thickness direction on the hinge part greatly increases the flexural rigidity of the hinge part in comparison with any increase in the torsional rigidity of the hinge part. Therefore, in this micro mirror apparatus, the separation of the primary natural frequency and the secondary natural frequency widens the servo band.

And another micro mirror apparatus according to the present invention is a micro mirror apparatus including a stationary part, a movable part connected to the stationary part through a hinge part, and a reflecting surface formed on the movable part, the movable part pivoting on the hinge part as its axis by torsional deformation of the hinge part.

And in this micro mirror apparatus, at least one of the edge connected to the stationary part of the hinge part or the edge connected to the movable part is made line symmetrically polygonal or curved surface shaped along the central axis of torsional deformation of the hinge part as its axis of symmetry.

In this micro mirror apparatus, at least one of the edge connected to the stationary part of the hinge part or the edge connected to the movable part is made line symmetrically polygonal or curved surface along the central axis of torsional deformation of the hinge part as its axis of symmetry, and this fact greatly enhances the flexural rigidity of the hinge part in comparison with any increase in the torsional rigidity of the hinge part. Therefore, the separation of the primary natural frequency and the secondary natural frequency widens the servo band.

And the optical disk apparatus according to the present invention is an optical disk apparatus for recording and/or reproducing information on an optical disk by irradiating light emitted from the light source onto the optical disk and includes a micro mirror apparatus that reflects the light emitted from the light source and irradiate the same onto the optical disk.

In this optical disk apparatus, the micro mirror apparatus includes a stationary part, a movable part connected to the stationary part through a hinge part, and a reflecting surface formed on this movable part, and the movable part pivoting on the hinge part as its axis by torsional deformation of the hinge part shifts the position of the light spot reflected by the reflecting surface and irradiated on the optical disk.

And in this micro mirror apparatus, on at least a part of the hinge part a protrusion protruding in the direction of its thickness is formed.

The formation of a protrusion protruding in the direction of thickness on the hinge part of the micro mirror apparatus in this optical disk apparatus greatly enhances the flexural rigidity of the hinge part in comparison with any increase in the torsional rigidity of the hinge part and widens the servo band. And this feature enables this micro mirror apparatus to demonstrate its outstanding performance as a jogging actuator and to serve as a precise tracking servo mechanism.

And another optical disk apparatus according to the present invention is an optical disk apparatus for recording and/or reproducing information on an optical disk by irradiating light emitted from the light source onto the optical disk including a micro mirror apparatus that reflects the light emitted from the light source and irradiate the same onto the optical disk.

In this optical disk apparatus, the micro mirror apparatus includes a stationary part, a movable part connected to the stationary part through a hinge part, and a reflecting surface formed on this movable part, and the movable part pivoting on the hinge part as its axis by torsional deformation of the hinge part shifts the position of the light spot reflected by the reflecting surface and irradiated on the optical disk.

And in this micro mirror apparatus, at least one of the edge connected to the stationary part of the hinge part or the edge connected to the movable part is made line symmetrically polygonal or curved surface shaped along the central axis of torsional deformation as its axis of symmetry.

In this optical disk apparatus, at least one of the edge part connected to the stationary part or the edge part connected to the movable part of the hinge part of the micro mirror apparatus is made line symmetrically polygonal or curved surface shaped along the central axis of torsional deformation of the hinge part as the axis of symmetry, and this fact considerably enhances the flexural rigidity of the hinge part in comparison with an increased torsional rigidity of the hinge part and therefore enables this micro mirror apparatus to demonstrate its outstanding performance as a jogging actuator and to serve as a precise tracking servo mechanism.

The micro mirror apparatus of the present invention enhances greatly only the flexural rigidity of the hinge part without causing any significant change in its torsional rigidity thus leading to a wider servo band.

And the optical disk apparatus of the present invention which uses a micro mirror apparatus having a wider servo band as a jogging actuator improves its track following performance and enables to realize high-speed accesses. And this optical disk apparatus can narrow recording tracks and therefore can realize a high-density record reproduction.

DESCRIPTION OF THE PREFERRED EMBODIMENTS

Figure 1:
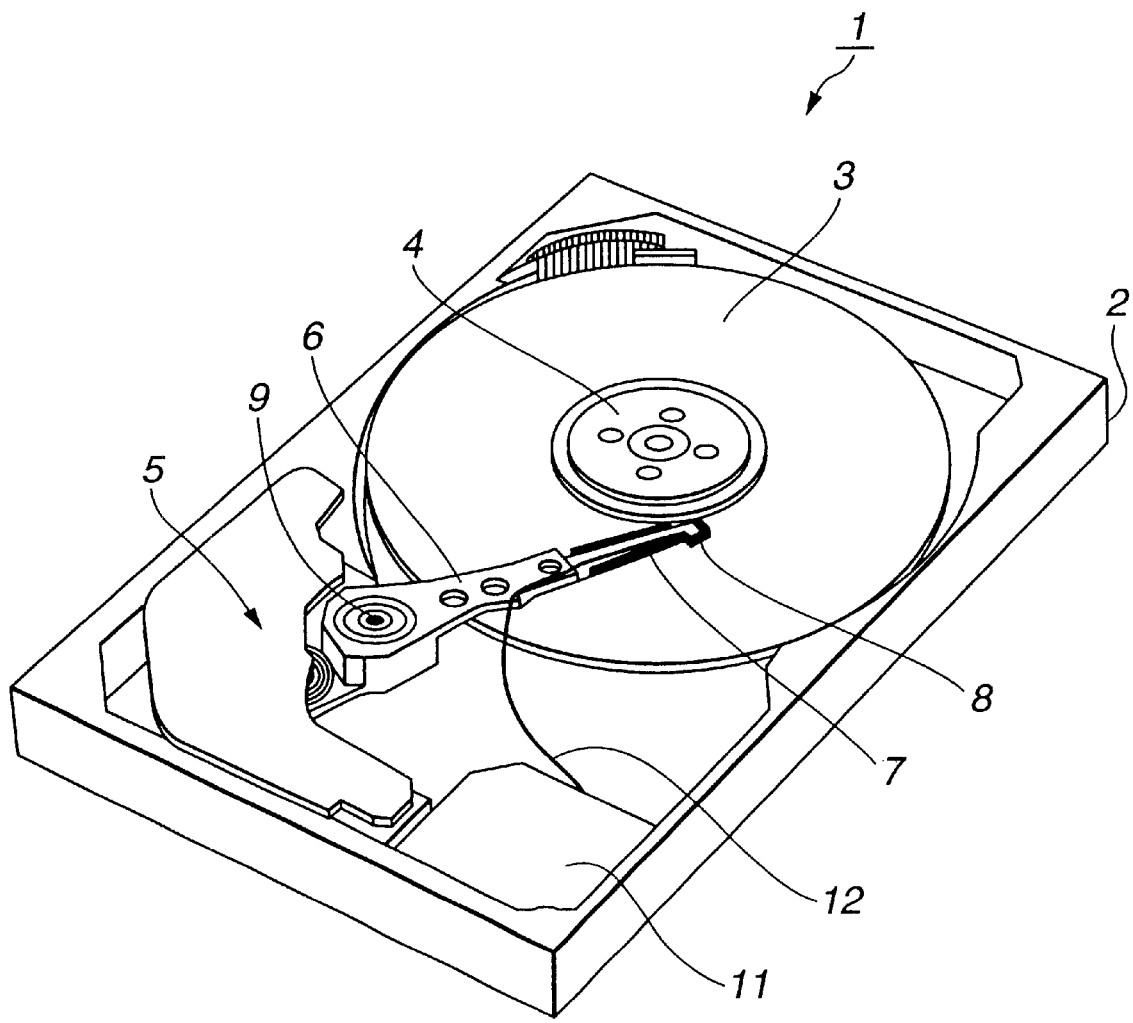
FIG. 1 is a schematic perspective showing an embodiment of an optical disk apparatus according to the present invention.

Referring to the drawings, preferred embodiments according to the present invention will be explained in detail.

FIG. 1 shows an embodiment of an optical disk apparatus in which a micro mirror apparatus according to the present invention is used as a jogging actuator. The optical disk apparatus 1 shown in FIG. 1 here is an apparatus developed by applying the technology of hard disk apparatuses having proven record of performance as memory devices in personal computers, and on an unshown spindle motor provided within the enclosure 2 an optical disk 3 is fitted as a recording medium and is fixed by means of a damper 4. The optical disk 3 rotates at a prescribed speed being driven by a spindle motor whose driving speed is controlled by a control circuit.

And within the enclosure 2, an arm 6 pivots being driven by a voice coil motor 5 and a head suspension spring 7 integrated with this arm 6 are provided and on the tip of the head suspension spring 7, a floating head 8 is fitted.

The voice coil motor 5 consists of a voice coil fitted on the arm 6 and a pair of magnets disposed in such a way as to pinch and hold this voice coil. The supply of electric current from outside to the voice coil results in a flow of electric current within this voice coil, which together with a magnetic field of the magnets generates a driving force, and enables the arm 6 and the head suspension spring 7 to pivot in the direction shown by X in FIG. 2 with a spindle 9 as the center of the pivoting motion.

Such pivoting motion of the arm 6 and the head suspension spring 7 being driven by the voice coil motor 5 leads to pivoting motion of a floating head 8 fitted on the tip of the head suspension spring 7 along the radius of the optical disk 3 while floating above the signal recording surface of the optical disk 3. Incidentally, FIG. 2 is an enlarged drawing showing the voice coil motor 5 and a part being driven thereby of the optical disk apparatus 1 shown in FIG. 1.

In this optical disk apparatus 1, as mentioned above, by rotating the optical disk 3 driven by a spindle motor, and by causing the arm 6 and the head suspension spring 7 to pivot being driven by the voice coil motor 5, the floating head 8 can be made to scan the whole signal recording surface of the optical disk 3.

And in this optical disk apparatus 1, the floating head 8 is provided with a micro mirror apparatus 10 and an unshown objective lens, and by having light led to the floating head 8 through optical fiber 12 from a light switching module 11 reflected on the reflecting surface of the micro mirror apparatus 10, and having the same reflected on the signal recording surface of the optical disk 3 through the objective lens, signals can be written into and read from the optical disk 3.

Figure 2:
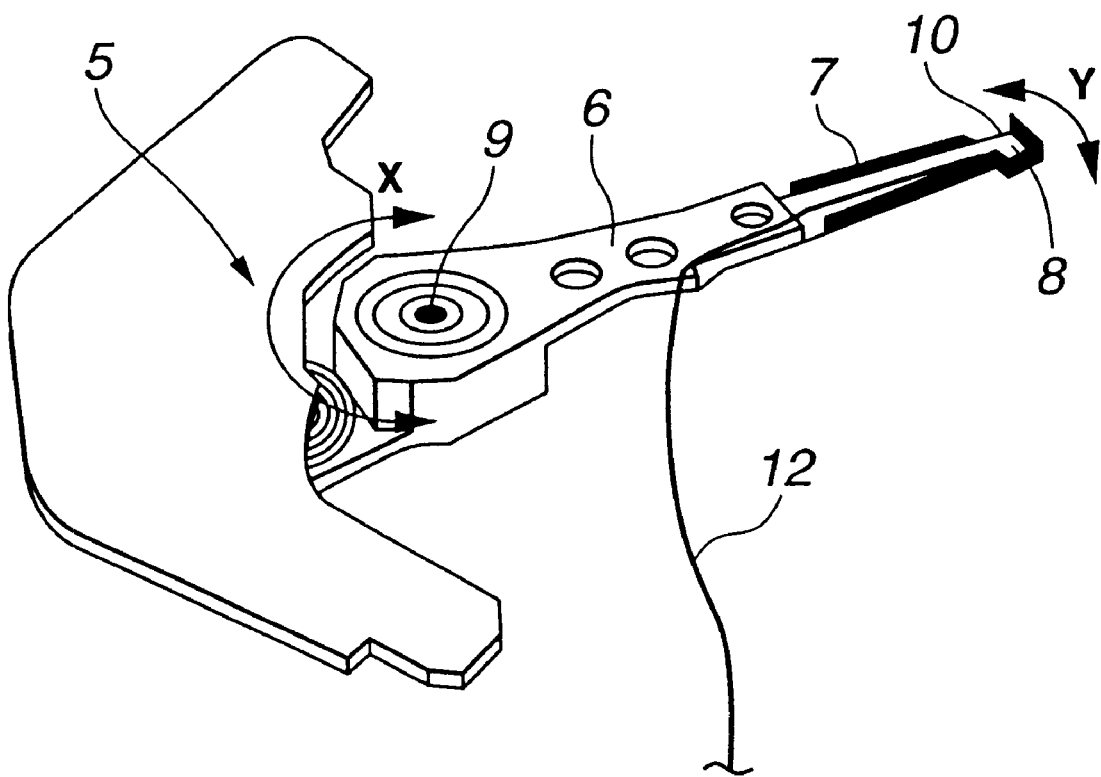
FIG. 2 is an enlarged schematic perspective showing a part rotationally driven by a voice coil motor of the optical disk apparatus.

And furthermore in this optical disk apparatus 1, by enabling the reflecting surface of the micro mirror apparatus 10 to incline in the direction shown by the arrow Y in FIG. 2 and by controlling the inclination of this reflecting surface, it is possible to adjust precisely the position of light spot irradiated on the signal recording surface of the optical disk 3 through the objective lens, and thus perform the function of a good tracking servo mechanism. In other words, in this optical disk apparatus 1, by having the voice coil motor 5 that drives the arm 6 and the head suspension spring 7 to pivot function as a fluttering actuator, and by having the micro mirror apparatus 10 function as a jogging motor, a two-stage actuator is formed, and this enables to widen the tracking servo band and to serve as a good tracking servo mechanism.

Figure 3:
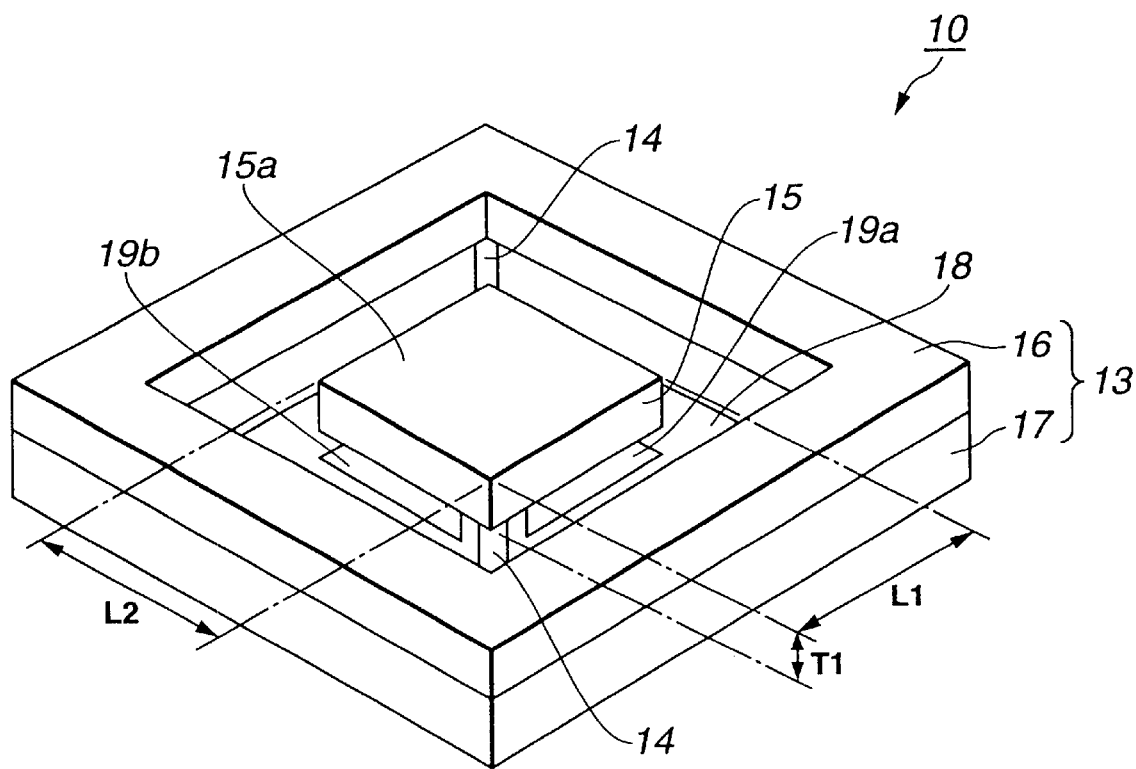
FIG. 3 is a schematic perspective showing an embodiment of a micro mirror apparatus according to this invention.

An embodiment of the micro mirror apparatus 10 used as a jogging actuator in the optical disk apparatus 1 is shown in FIG. 3. In this FIG. 3, however, in order to show clearly the construction, the dimensions of various parts are shown in ratios different from the actual ones.

The micro mirror apparatus 10 includes, as shown in FIG. 3, a stationary part 13, and a movable part 15 connected to this stationary part through a hinge part 14. The stationary part 13 consists of a frame body 16 formed in a ring with its center cut out by dry etching of Si wafer and a glass substrate 17 joined with the frame body 16 by the electrode junction method. And in the central part cut out of the frame body the movable part 15 is disposed being supported by the hinge part 14.

The movable part 15 is, like the frame body 16, made of Si wafer formed into a prescribed shape by dry etching. In other words, this movable part 15 and the frame body 16 are both made of a single Si wafer, and this Si wafer is processed by dry etching. The central part separated from the Si wafer by dry etching becomes the movable part 15 and the outer circumference becomes the frame body 16. In specific terms, the movable part 15 has a square or rectangular plane shape, and the length of each side L1 and L2 is respectively about 100~1,000 $\mu$m and its thickness T1 is about 1~100 $\mu$m.

On the movable part 15, an unshown electrode is provided on the main surface opposite to the glass substrate 17 of the stationary part 13. And on the main surface on the other side of the movable part, a reflecting film is formed to reflect light, and the main surface of the movable part 15 where this reflecting film is formed serves as the reflecting surface 15a.

Figure 4:
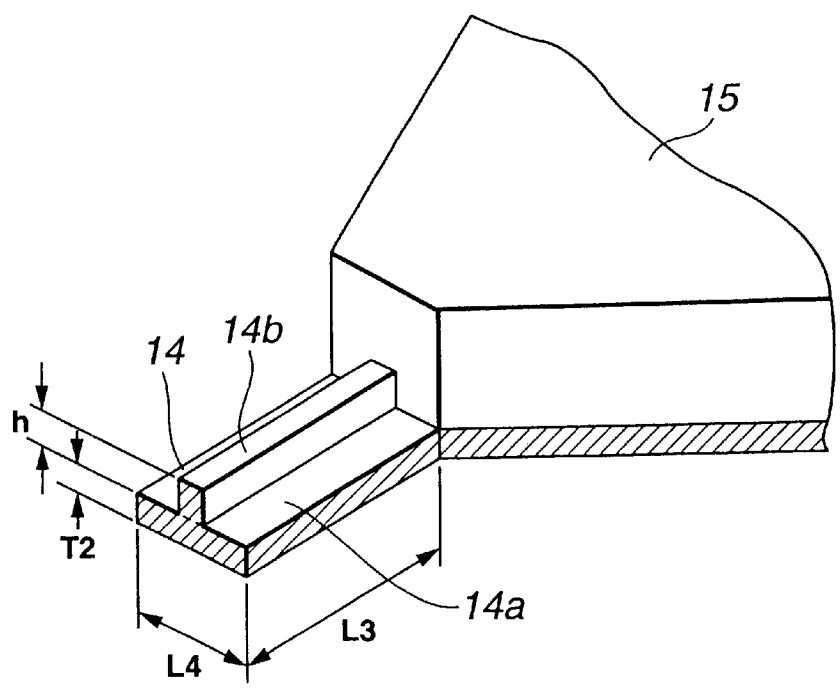
FIG. 4 is an enlarged schematic perspective showing the vicinity around the hinge part of the micro mirror apparatus.

The hinge part 14 consists of a hinge body part 14a formed in the shape of a band as shown in FIG. 4 from, for example, a $SiN_x$ film coated on a Si wafer which will be the movable part 15 and the frame body 16 and a protrusion 14b protruding in the direction of its thickness on this hinge body part 14a. And this hinge part 14 is joined at one end of its long hand with the movable part 15 and the other end is joined with the frame body 16, thus linking the movable part 15 and the frame body 16.

The hinge body part 14a of this hinge part 14 is formed, for example as shown in FIG. 4, in such a way that its cross section cut along the short side direction presents a oblong sideways shape. In specific terms, the hinge body part 14a is formed in such a way that its lengths along the long side L3 is 1~20 $\mu$m, its length along the short side L4 is 0.1~20 $\mu$m and its thickness T2 is about 0.1~10 $\mu$m.

And the protrusion 14b of the hinge part 14 is formed consecutively, for example as shown in FIG. 4, on the whole length of the hinge body part 14a, in other words for the whole area between the movable part 15 and the frame body 16 at the center of the short side of the hinge body part 14a, in other words along the central axis of torsional deformation of the hinge part 14.

Due to the provision of a protrusion 14b protruding in the direction of thickness of the hinge body part 14a as described above, the hinge part 14 can substantially increase only its flexural rigidity without changing so much its torsional rigidity in comparison with a situation that would have developed if the protrusion 14b had not existed. And this important increase only in the flexural rigidity of the hinge part 14 results in a wider servo band of the micro mirror apparatus 10 as described in detail below.

The hinge part 14 in which the protrusion 14b is provided on the hinge body part as described above is formed, for example, as described below.

For forming this hinge part 14, at first on one side of the main surfaces of a Si wafer constituting the movable part 15 and the frame body 16, a groove of a shape corresponding to the protrusion 14b of the hinge part 14 is formed. Then, on the main surface of a Si wafer on which this groove is formed, $SiN_x$ and other materials are coated to constitute the hinge part 14. And the surface of a $SiN_x$ film coated on the main surface of this Si wafer is polished to level the surface, and to determine the thickness of the part which will be the hinge body part 14a.

Then on the $SiN_x$ film the surface of which has been polished, a resist pattern of the shape corresponding to the plane shape of the hinge body part 14b is formed. And this resist pattern is then used as a mask to etch the $SiN_x$ film and to form the $SiN_x$ film in the shape of the hinge part 14.

Finally, the Si wafer is dry etched and the movable part 15 is separated from the frame body 16. Thus, Si wafer in the neighborhood of the SiN$_x$ film that has been formed is removed, and the hinge part 14 in which a protrusion 14b is provided on the hinge body part 14a as shown in FIG. 4 is completed.

On the glass substrate 17 constituting the stationary part 13 alongside the frame body 16, a concavity for forming an electrode 18 is provided on the side opposite to the main surface where an electrode of the movable part 15 is provided. And in this concavity for forming electrodes 18, a pair of addressing electrodes 19a, 19b opposite to the electrode of the movable part 15 are formed.

In the micro mirror apparatus 10 configured as described above, the application of different signal voltages to the pair of addressing electrodes 19a, 19b results in the generation of mutually opposite electrostatic force between this pair of opposing electrodes 19a, 19b and the electrode of the movable part 15. This in turn causes the movable part 15 to pivot on the hinge part 14 as its axis, and the reflecting surface 15a of the movable part 15 to incline to the specified directions. And the inclination of this reflecting surface 15a can be controlled by controlling the voltage applied on a pair of addressing electrodes 19a, and 19b.

The micro mirror apparatus 10 which can thus incline optionally the reflecting surface 15a can be used as a jogging actuator of the optical disk apparatus 1. And this micro mirror apparatus 10, in which only the flexural rigidity of the hinge part 14 is conspicuously enhanced without causing any noticeable changes in the torsional rigidity thereof and therefore the servo band is widened, demonstrates an outstanding performance as a jogging actuator of the optical disk apparatus 1.

Figure 5:
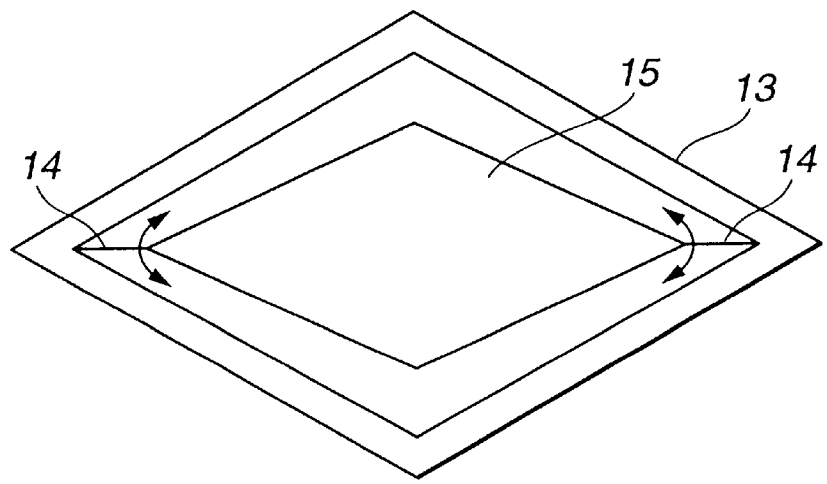
FIG. 5 is a drawing illustrating the vibration mode of the micro mirror apparatus, a drawing typically showing the primary vibration mode.
Figure 6:
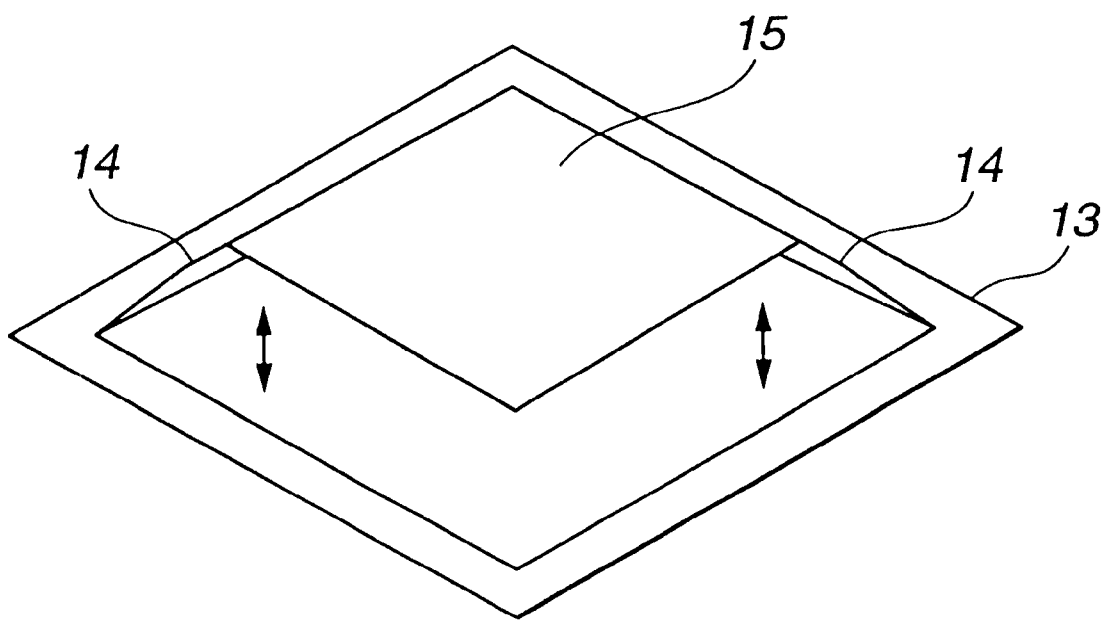
FIG. 6 is a drawing illustrating the vibration mode of the micro mirror apparatus, a drawing typically showing the secondary vibration mode.

To describe in detail, in this type of micro mirror apparatus 10, as shown in FIG. 5, a vibration mode in which the movable part 15 pivots on the axis of the hinge part 14 is generated as the primary vibration mode. The primary natural frequency that creates this primary vibration mode depends on the torsional characteristics of the hinge part 14, and a high value of the torsional rigidity of the hinge part 14 raises the primary natural frequency, while on the contrary a low value of the torsional rigidity of the hinge part 14 reduces the primary natural frequency. And in this type of micro mirror apparatus 10, as shown in FIG. 6, a vibration mode in which the movable part 15 vibrates out of plane is generated as the secondary vibration mode. The secondary natural frequency creating this secondary vibration mode depends on the flexural characteristics of the hinge part 14, and a high value of the flexural rigidity of the hinge part 14 increase the secondary natural frequency while on the contrary a low value of the flexural rigidity of the hinge part 14 reduces the secondary natural frequency.

When this micro mirror apparatus 10 is used as a jogging actuator of the optical disk apparatus 1, the zone between the primary natural frequency and the secondary natural frequency shall be the servo band in this micro mirror apparatus 10. Therefore, in order to enable this micro mirror apparatus 10 to demonstrate an excellent performance as a jogging actuator, it is desirable to separate as much as possible the primary natural frequency and the secondary natural frequency and to widen the servo band.

In the micro mirror apparatus 10 of the present invention, as mentioned above, the hinge part 14 is provided with a protrusion 14b, and only the torsional rigidity of the hinge part 14 is greatly enhanced without causing any noticeable change in the flexural rigidity of the hinge part 14. Therefore, in this micro mirror apparatus 10, only the secondary natural frequency is considerably enhanced without causing any significant change in the primary natural frequency thus widening the servo band.

And in the optical disk apparatus 1 in which this micro mirror apparatus 10 is used as a jogging actuator, a fluttering actuator consisting of a voice coil motor 5 and a jogging actuator consisting of a micro mirror apparatus 10 constitute a two-stage actuator, which serves as a good tracking servo mechanism.

Figure 7:
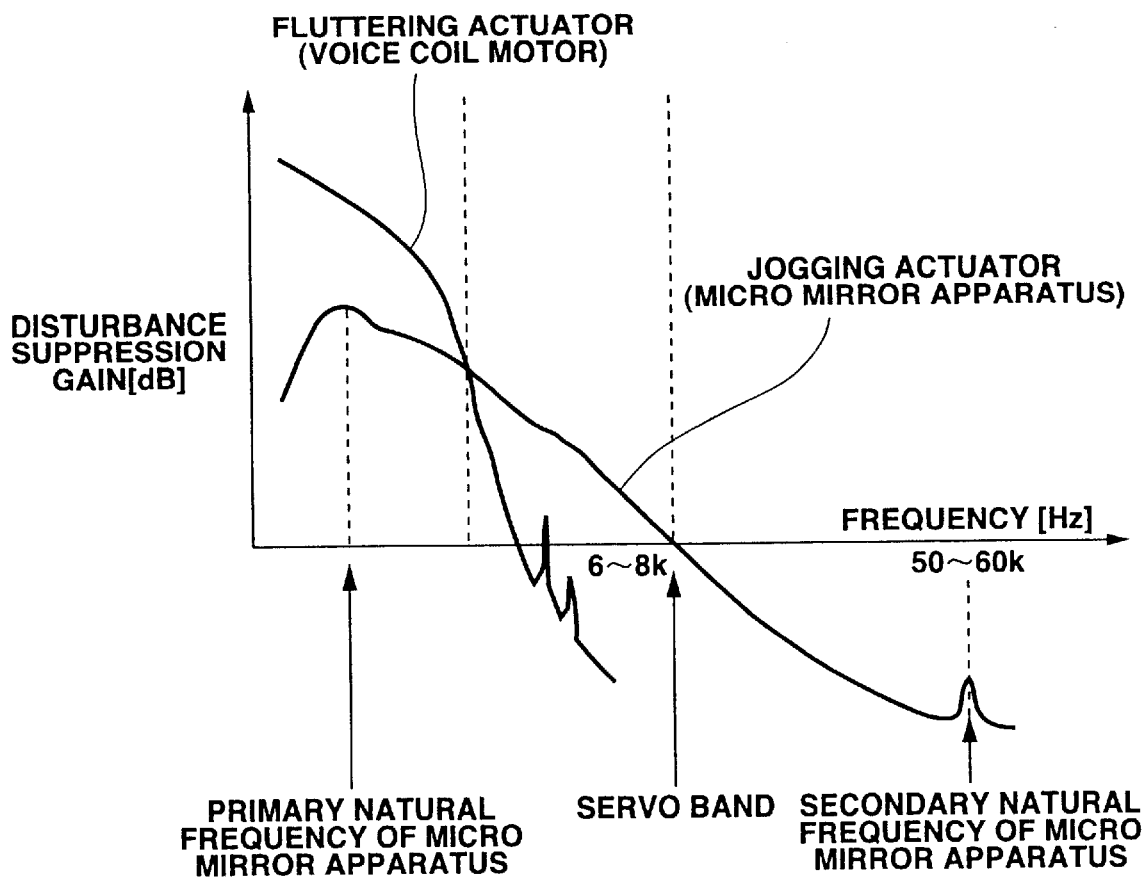
FIG. 7 is a drawing showing the transfer function of a two-stage actuator of the optical disk apparatus.

The transfer function of the two-stage actuator serving as a tracking servo mechanism in the optical disk apparatus 1 is typically shown in FIG. 7. As shown in this FIG. 7, the servo band of the fluttering actuator consisting of a voice coil motor 5 is generally 1 kHz or less, but it has a high disturbance suppression gain in a low band. On the other hand, the jogging actuator consisting of the micro mirror apparatus 10 has a smaller disturbance suppression gain in the low band as compared with the fluttering actuator, but it is assured of a disturbance suppression gain even in a high band of 1 kHz or above.

In a two-stage actuator, the combination of a fluttering actuator and a jogging actuator enables to secure a disturbance suppression gain in the low zone and yet to extend the band to a higher zone. Thus, it has become possible to operate in a wider band.

Figure 8:
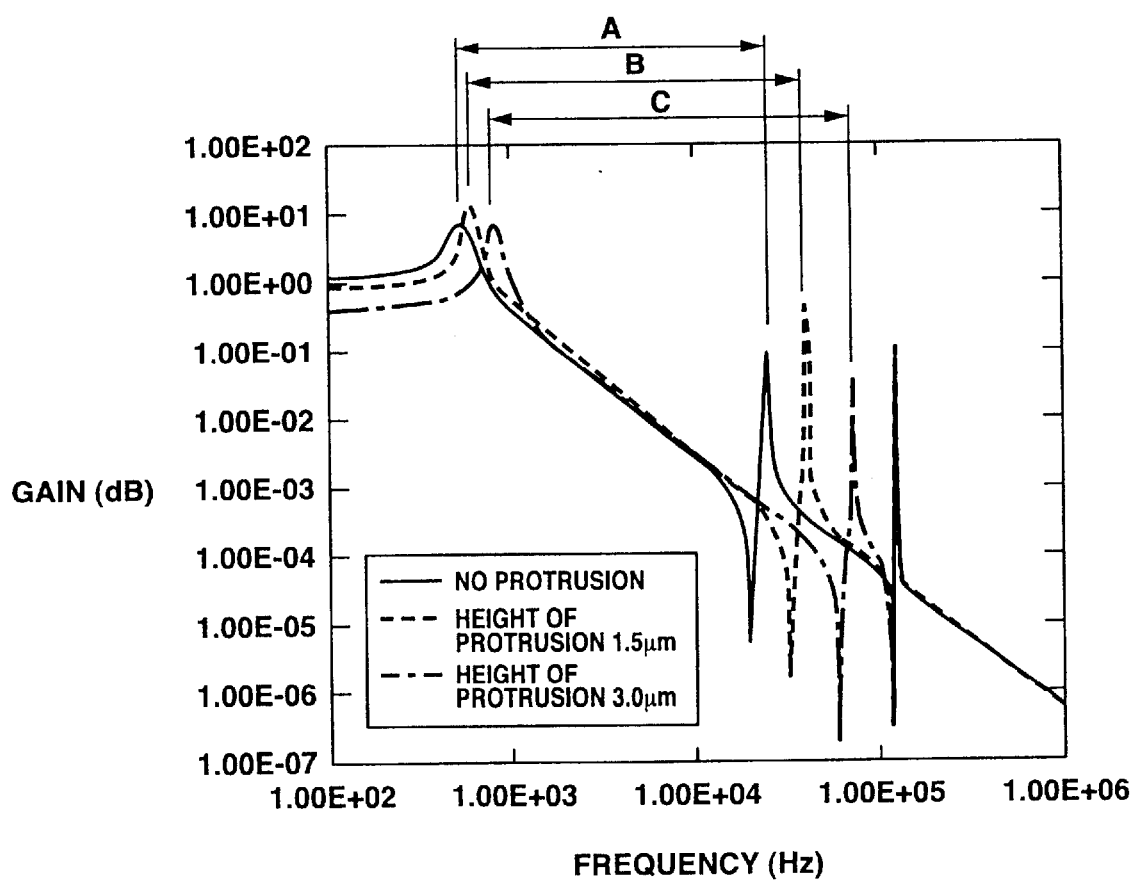
FIG. 8 is a drawing showing the transfer function of the micro mirror apparatus in which a protrusion is formed on the hinge part in comparison with the transfer function of a micro mirror apparatus in which no protrusion is formed on the hinge part.

The transfer function of the micro mirror apparatus 10 of the present invention in which the hinge part 14 has a protrusion 14b, and the transfer function of a micro mirror apparatus without any protrusion on the hinge part are respectively shown in FIG. 8. In this FIG. 8, the transfer function of a micro mirror apparatus without any protrusion on the hinge part is shown with a solid line, the transfer function of the micro mirror apparatus 10 in which a protrusion 14b with a height h of 1.5 $\mu$m extends on the entire length of the hinge body part 14a on the central axis of its torsional deformation is shown with a broken line, and the transfer function of the micro mirror apparatus 10 in which a protrusion 14b with a height h of 3.0 $\mu$m extends on the entire length of the hinge body part on the central axis of its torsional deformation is shown with a chain line with a dot. And the movable part of each micro mirror apparatus is made of Si, its plane shape is square, the length of each side L1 and L2 is respectively about 750 $\mu$m, and the thickness T1 is about 100 $\mu$m. The hinge body part of each micro mirror apparatus is made of SiN$_x$, its plane shape is square, the length of each side L3 and L4 is respectively about 10 $\mu$m, and its thickness T2 is about 1 $\mu$m.

As shown in FIG. 8, the zone between the primary natural frequency and the secondary primary frequency or the servo band (B and C in FIG. 8) of the micro mirror apparatus 10 of the present invention with a protrusion 14b formed on the hinge part 14 is wider than the servo band (A in FIG. 8) of a micro mirror apparatus without any protrusion formed on its hinge part.

Therefore, when the micro mirror apparatus 10 of the present invention is used as a jogging actuator of the optical disk apparatus 1, the servo band of the entire two-stage actuator will be wider. This will enable the optical disk apparatus 10 to serve as a tracking servo mechanism on a much wider zone.

As it will be understood by looking at the FIG. 8, the higher the height h of the protrusion 14b of the hinge part 14, the higher will be the torsional rigidity of the hinge part 14 and consequently the secondary natural frequency of the micro mirror apparatus 10. But at the same time, this will result in a higher flexural rigidity of the hinge part 14 and the primary natural frequency will be higher accordingly. Therefore, it is desirable to choose and set as the situation requires the optimal value for the height h of the protrusion 14b of the hinge part 14 taking into account the servo band required for the micro mirror apparatus 10.

The foregoing is the description of the micro mirror apparatus 10 in which the protrusion 14b of the hinge part 14 is formed on the entire length of the hinge body part 14a, in other words on the whole area between the movable part 15 and the frame body 16 along the center in the direction of the shorter side of the hinge body part 14a, in other words along the central axis of torsional deformation of the hinge part 14. In the micro mirror apparatus of the present invention, however, the position of forming the protrusion 14b is not limited to the above embodiment. It may be formed, for example, extemporaneously at any position on the hinge body part 14a. Even if the protrusion 14b is formed extemporaneously at any position on the hinge body part 14 in this way, the hinge part 14 can increase its flexural rigidity without causing any significant change in its torsional rigidity. In order to increase its flexural rigidity most effectively, however, it is desirable that the protrusion 14b is continuously formed on the entire length of the hinge body part 14a along the central axis of its torsional deformation.

Figure 9:
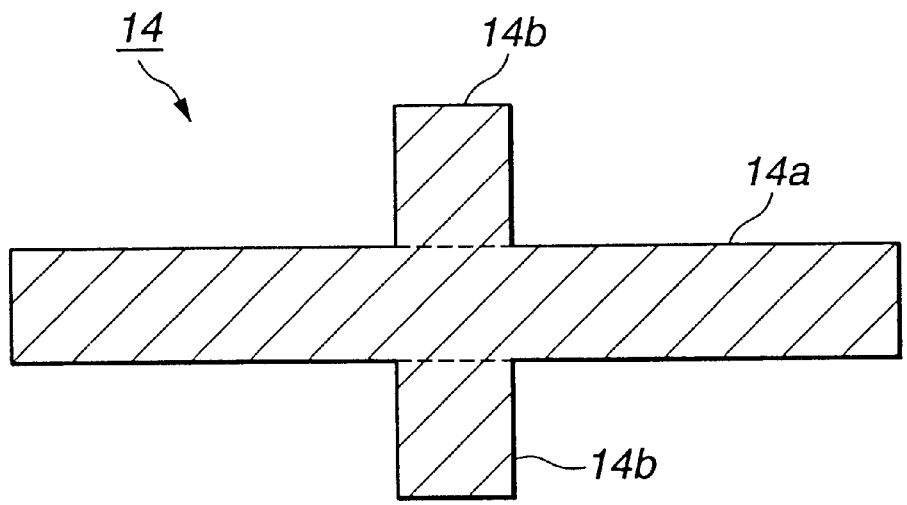
FIG. 9 is a cross section showing the point where a protrusion is formed respectively on the upside and downside of the hinge body part as cut in the direction of its thickness.

And the protrusion 14b of the hinge part 14 may be formed, as shown in FIG. 9, on both sides, the topside and downside of the hinge body part 14a. When the protrusion 14b is formed respectively on the topside and downside of the hinge body part 14a, it is possible to further enhance the flexural rigidity of the hinge part 14.

Figure 10:
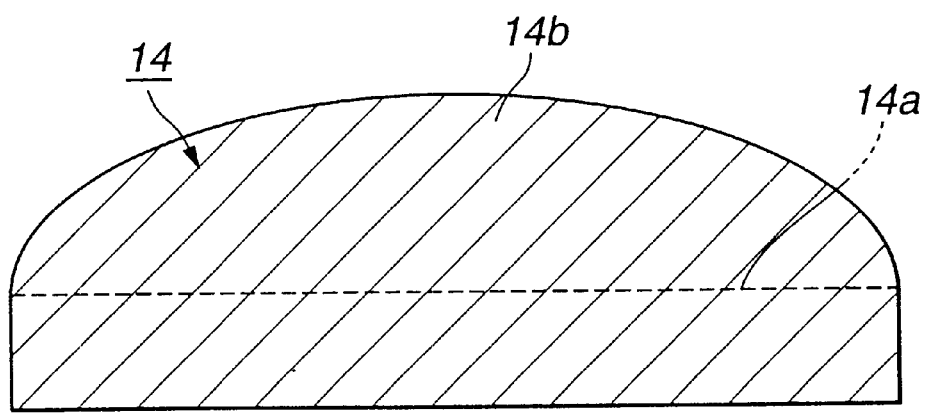
FIG. 10 is a cross section showing the point where a protrusion is formed in the shape of a gentle curved surface over the entire short side on the upside or downside of the hinge body part cut in the direction of its thickness.
Figure 11:
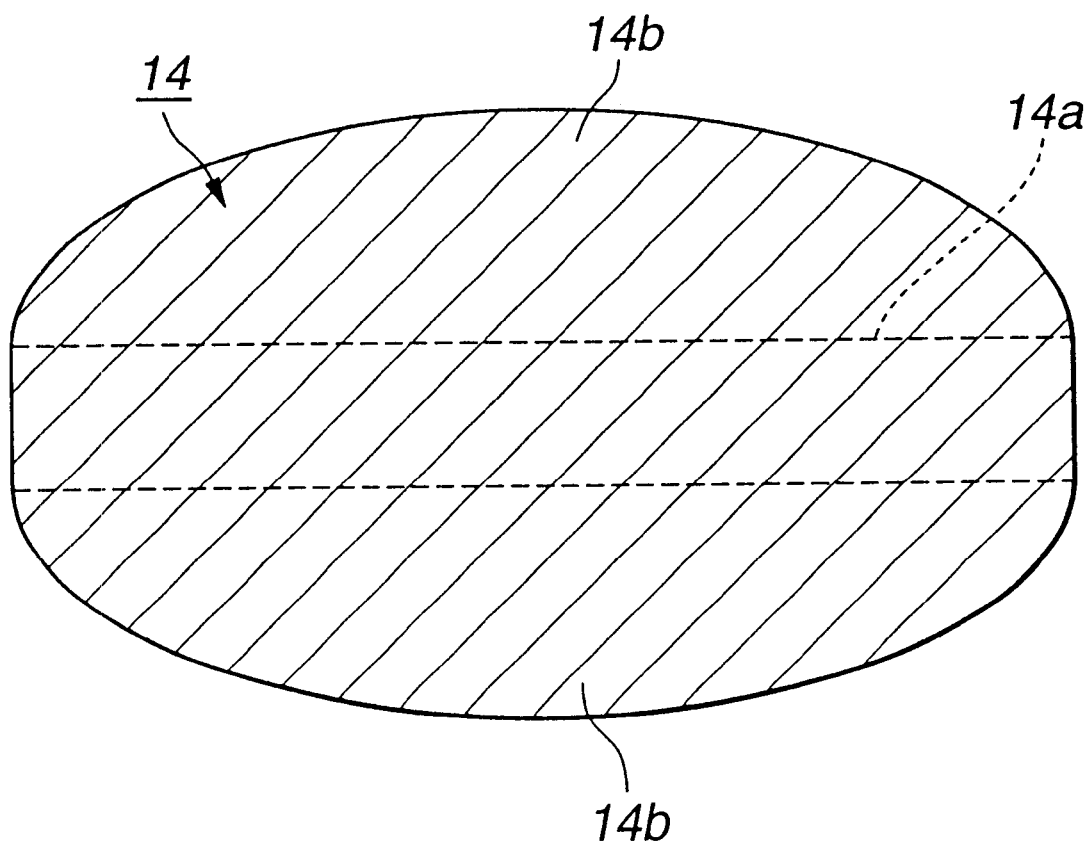
FIG. 11 is a cross section showing the point where protrusions are formed in the shape of a gentle curved surface over the entire short side on the upside and downside of the hinge body part cut in the direction of its thickness.

The protrusion 14b of the hinge part 14 may, as shown in FIG. 10, be formed in a gentle curved shape over the entire short upside or downside of the hinge body part 14a so that the cross section of the whole hinge part 14 in the thickness direction at the point where the protrusion 14b is formed may be quasi semicircular or quasi semielliptic, or as shown in FIG. 11, may be formed in a gentle curved shape over the entire both short upside and downside of the hinge body part 14a so that the cross section of the entire hinge part 14 in the thickness direction at the point where the protrusion 14b is formed may be quasi circular or quasi elliptic. When the protrusion 14b is formed as described above in a gentle curved shape over the entire short upside or downside or both short sides of the hinge body part 14a and the cross section in the thickness direction of the entire hinge part 14 at the point where the protrusion 14b is formed is quasi semicircular or quasi semi elliptic or quasi circular or quasi elliptic, it will be possible to further enhance the flexural rigidity of the hinge part 14. Incidentally, FIGS. 9–11 show the cross section of the point where the protrusion 14b of the hinge part 14 is formed when it is cut in the direction of its short side.

The foregoing describes the micro mirror apparatus 10 in which the protrusion 14b is formed on the hinge part 14 to enhance largely only the flexural rigidity of the hinge part 14 without causing any significant change in the torsional rigidity thereof and to widen the servo band. In order to enhance largely the flexural rigidity of the hinge part 14 without causing any significant change in the torsional rigidity thereof, however, it is also effective to make either one or both of the edge connected with the movable part 15 of the hinge part 14 and another edge connected with the frame body 16 of the hinge part 14 line symmetrically polygonal or curved surface shaped along the central axis of torsional deformation of the hinge part 14 as their axis of symmetry.

Hereafter, we will describe a micro mirror apparatus in which an edge and another edge of the hinge part 14 are line symmetrically polygonal or of curved surface shaped along the central axis of torsional deformation of the hinge part 14 as their axis of symmetry. Incidentally, due to the fact that, in the micro mirror apparatus described below, the parts other than the hinge part 14 are configured in the same way as the micro mirror apparatus described above is, we shall omit detailed descriptions on parts other than the hinge part 14.

Figure 12:
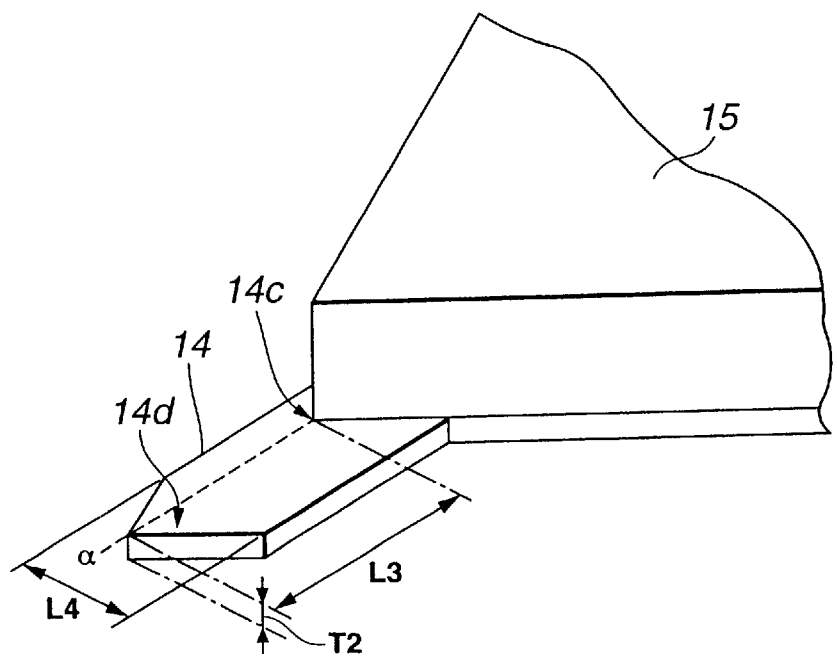
FIG. 12 is a drawing showing an embodiment of another micro mirror apparatus according to the present invention, and an enlarged schematic perspective showing the vicinity around the hinge part of this micro mirror apparatus.
Figure 13:
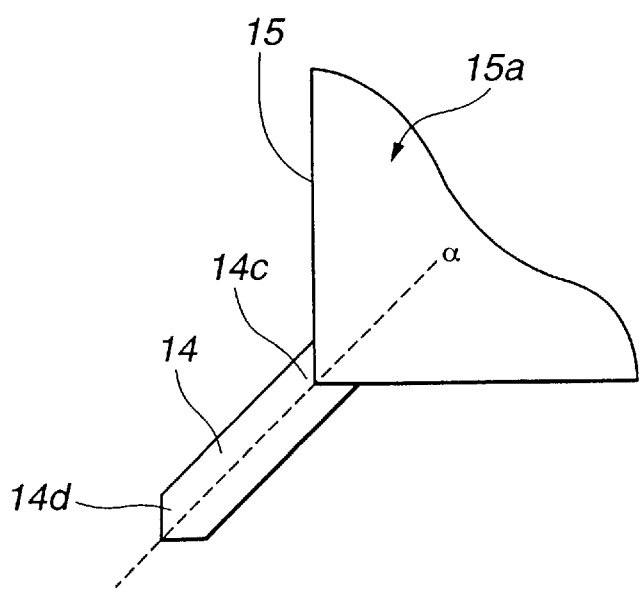
FIG. 13 is a plan showing the vicinity of the hinge part of the micro mirror apparatus.

The hinge part 14 of this micro mirror apparatus, as shown for example in FIG. 12 and FIG. 13, consists of a $SiN_x$ film formed in the shape of a band. And an edge 14c of this hinge part 14 joined with the movable part 15 is cut out inward conforming to the shape of the angular part of the movable part 15. In specific terms, an edge 14c of the hinge part 14 is cut out in the shape of a triangle having its apex on the central axis α of torsional deformation conforming to the rectangular angular part of the movable part 15.

And the other edge 14d of this hinge part 14 joined with the frame body 16 is in the shape conforming to the cut out shape of the edge 14c, or specifically in the shape of a triangle having its apex on the central axis α of torsional deformation of the hinge part 14.

In other words, in this hinge part 14, an edge 14c joined with the movable part 15 and the other edge 14d joined with the frame body 16 have respectively a line symmetrical shape with the central axis α of torsional deformation of the hinge part 14. And when viewed from the side of the reflecting surface 15a of the movable part 15, as shown in FIG. 13, this hinge part 14 is formed in such a way that as a whole it presents the shape of feathering.

Figure 14:
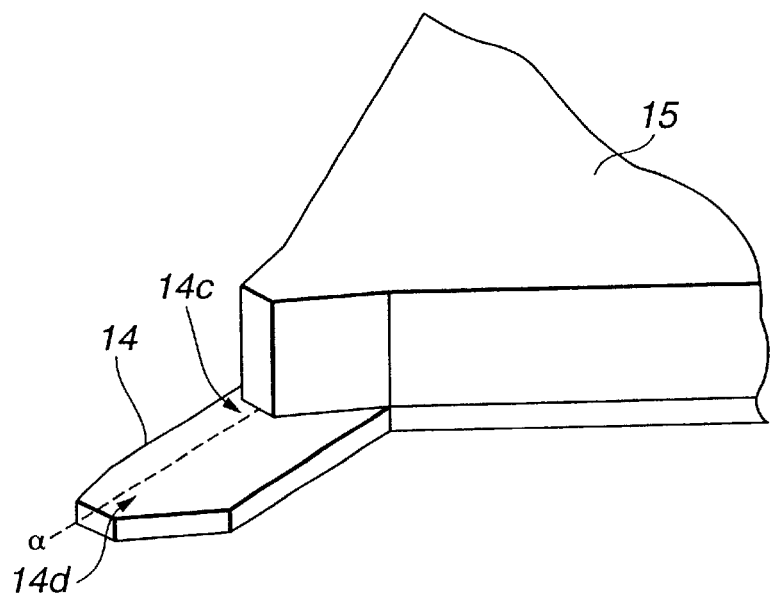
FIG. 14 is a drawing showing an embodiment of further another micro mirror apparatus according to the present invention, and an enlarged schematic perspective showing the vicinity of this micro mirror apparatus.
Figure 15:
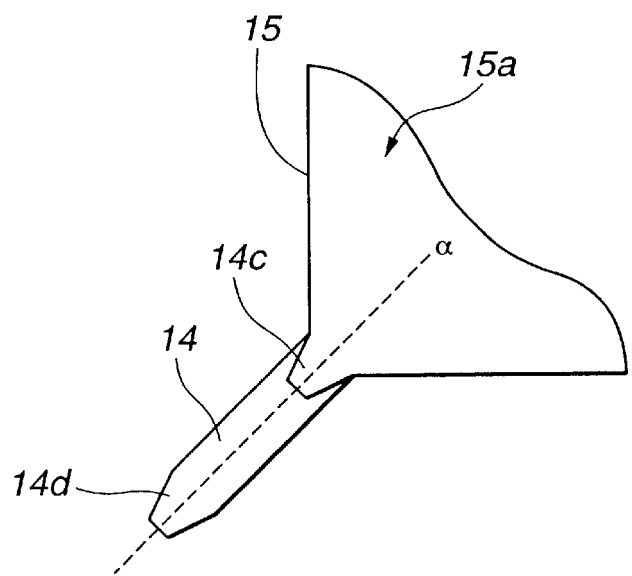
FIG. 15 is an enlarged plan showing the vicinity around the hinge part of the micro mirror apparatus.

And the edge 14c joined with the movable part 15 of the hinge part 14 may be cut out, for example as shown in FIG. 14 and FIG. 15, in the shape of a trapezoid conforming to the angular part of the movable part 15 and the other edge 14d joined with the frame body 16 may be in the shape of trapezoid conforming to the cut out shape of the edge 14c. In this case also, the edge 14c joined with the movable part 15 of the hinge part 14 and the other edge 14d joined with the frame body 16 are respectively line symmetrical along the central axis α of torsional deformation of the hinge part 14 as their axis of symmetry.

Figure 16:
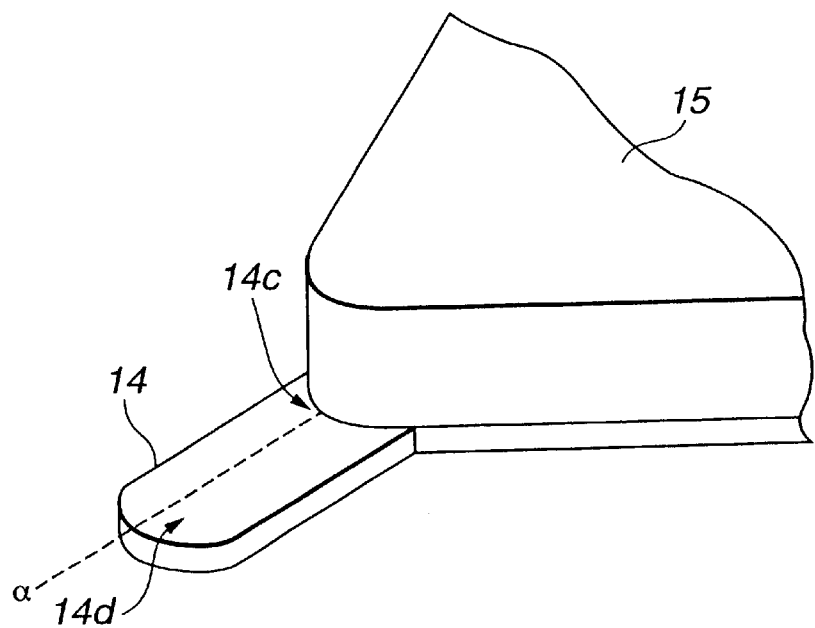
FIG. 16 is a drawing showing an embodiment of further another micro mirror apparatus according to the present invention, and an enlarged schematic perspective showing the vicinity around this micro mirror apparatus.
Figure 17:
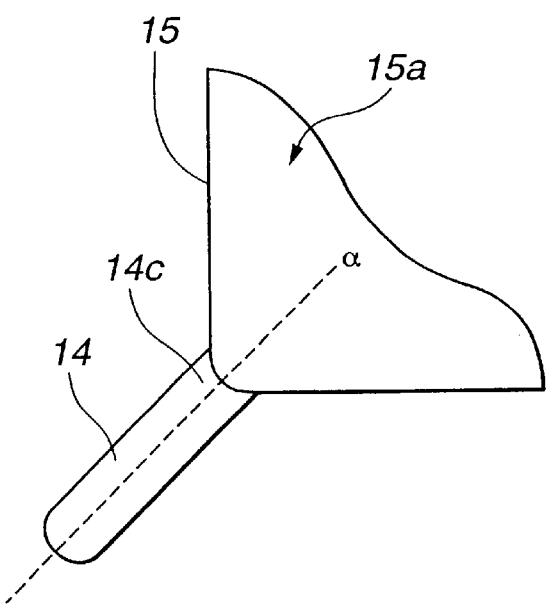
FIG. 17 is an enlarged plan showing the vicinity of the hinge part of the micro mirror apparatus.

And the edge 14c of the hinge part 14 joined with the movable part 15 may be, for example as shown in FIG. 16 and FIG. 17, cut out in the shape of a curved surface conforming to the angular part of the movable part 15, and the other edge 14d joined with the frame body 16 may be in the shape of curved surface conforming to the cut out shape of the edge 14c. In this case also, the edge 14c joined with the movable part 15 of the hinge part 14 and the other edge 14d joined with the frame body 16 are respectively in a line symmetrical shape along the central axis α of torsional deformation of the hinge part 14 as their axis of symmetry.

In this micro mirror apparatus, as described above, the fact that an edge 14c and the other edge 14d of the hinge part 14 are line symmetrically polygonal or curved surface shaped along the central axis α of torsional deformation of the hinge part 14 enhances greatly exclusively the flexural rigidity of the hinge part 14 without causing any noticeable change in torsional rigidity of the hinge part 14. And this micro mirror apparatus benefits from an enhanced secondary natural frequency resulting from the fact that only the flexural rigidity of the hinge part 14 is largely reinforced and therefore the secondary natural frequency increases and the servo band thereof has become wider.

The hinge part 14 in which an edge 14c and other edge 14d are line symmetrically polygonal or curved surface shaped along the central axis of torsional deformation of the hinge part 14 as the axis of symmetry as mentioned above is formed for example as follows.

This hinge part 14 is formed by in the first place by coating SiN$_x$ materials constituting the hinge part 14 to form a film on a side of the main surface of the Si wafer constituting the movable part 15 and the frame body 16.

Then, on the SiN$_x$ film coated on a side of the main surface of the Si wafer, a resist pattern of a shape corresponding to the plane shape of the hinge part 14, in other words, line symmetrical polygonal or curved surface shape of an edge 14c and the other edge 14d along the central axis of torsional deformation of the hinge part 14 as the axis of symmetry is formed. And this resist pattern is used as a mask to etch the SiN$_x$ film forming a SiN$_x$ film in the shape of the hinge part 14.

Finally, the Si wafer is dry etched, the movable part 15 is separated from the frame body 16 and the Si wafer near the SiN$_x$ film that has been formed is removed. And thus, the hinge part 14 in which an edge 14c and another edge 14d are line symmetrically polygonal or curved surface shaped along the central axis of torsional deformation of the hinge part 14 as their axis of symmetry is completed.

Figure 18:
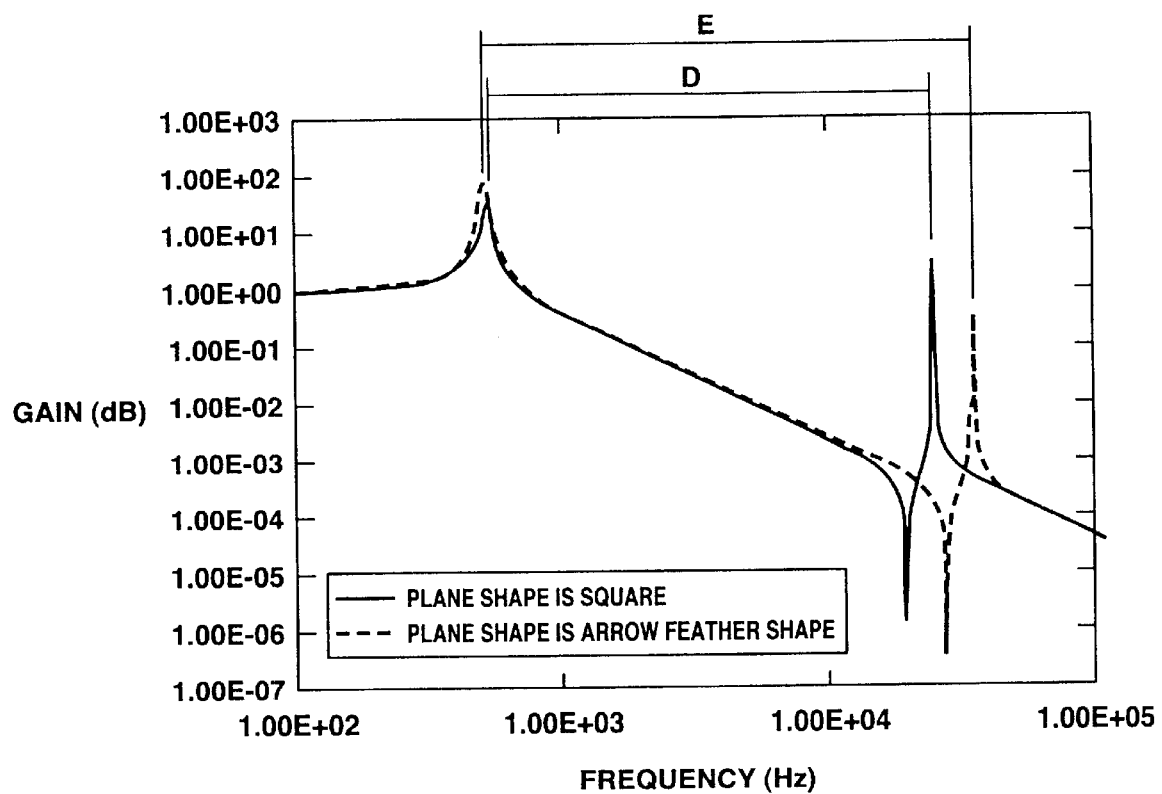
FIG. 18 is a drawing showing the transfer function of the micro mirror apparatus in which the plane shape of the hinge part is feathering in comparison with the transfer function of a micro mirror apparatus in which the plane shape of the hinge part is square.

The transfer function of the micro mirror apparatus of the present invention in which the hinge part 14 is in the shape of feathering as shown in FIG. 12 and FIG. 13 and the transfer function of the micro mirror apparatus in which the plane shape of the hinge part is square are respectively shown in FIG. 18. Incidentally, in this FIG. 18, the transfer function of the micro mirror apparatus of the present invention in which the plane shape of the hinge part 14 is feathering is shown with a broken line. And the movable part of each micro mirror apparatus is made of Si, its plane shape is square, the length of each side L1 and L2 is respectively about 750 μm, and its thickness T1 is about 100 μm. And the hinge part of each micro mirror apparatus is made of SiNx, the length of each side L3 and L4 is respectively about 10 μm, and its thickness T2 is about 1 μm.

As shown in FIG. 18, the zone between the primary natural frequency and the secondary natural frequency, in other words the servo band (E in FIG. 18), of the micro mirror apparatus of the present invention in which the plane shape of the hinge part 14 is feathering is wider than the servo band (D in FIG. 18) of the micro mirror apparatus in which the plane shape of the hinge part is square. In specific terms, in the micro mirror apparatus in which the plane shape of the hinge part is square, the primary natural frequency is 549 Hz, the secondary natural frequency is 25,860 Hz and the servo band D is 25,310 Hz. On the other hand, in the micro mirror apparatus of the present invention in which the plane shape of the hinge part 14 is feathering, the primary natural frequency is 525 Hz, the secondary natural frequency is 35,870 Hz, and the servo band E is 35,350 Hz. This shows that the servo band E of the micro mirror apparatus of the present invention in which the plane shape of the hinge part 14 is feathering is wider by about 10 KHz than the servo band D of the micro mirror apparatus in which the plane shape of the hinge part is square.

As described above, the micro mirror apparatus of the present invention widens the servo band by making an edge and the other edge of the hinge part 14 line symmetrically polygonal or curved surface shaped along the central axis of torsional deformation of the hinge part 14 as its axis of symmetry. Therefore, the use of such a micro mirror apparatus as a jogging actuator of the optical disk apparatus 1 widens the servo band of the two-stage actuator as a whole. And this enables the optical disk apparatus 10 to serve as a tracking servo mechanism on a wider range.

The forgoing is a description of a micro mirror apparatus in which both an edge 14c and the other edge 14d of the hinge part 14 are line symmetrically polygonal or curved surface shaped along the central axis α of torsional deformation of the hinge part 14 as their axis of symmetry. However, the micro mirror apparatus can demonstrate a similar performance if either one of the edge 14c or the other edge 14d of the hinge part 14 are line symmetrically polygonal or curved surface shaped along the central axis α of torsional deformation of the hinge part 14 as its axis of symmetry.

And the shape of an edge 14c and the other edge 14d of the hinge part 14 is not limited to the embodiment mentioned above, and whatever shape can produce a similar effect provided that the shape is line symmetrically polygonal or curved surface along the central axis α of torsional deformation of the hinge part 14 as its axis of symmetry.

The foregoing are separate descriptions of the micro mirror apparatus 10 in which a protrusion 14b is formed on the hinge part 14 and the micro mirror apparatus in which either one or both the edge 14c and the other edge 14d of the hinge part 14 is or are line symmetrically polygonal or curved surface shaped along the central axis α of torsional deformation of the hinge part 14 as its or their axis of symmetry. The combination of these features to create a micro mirror apparatus in which a protrusion 14b is formed on the hinge part 14 and at the same time either one or both the edge 14c and the other edge 14d of the hinge part is or are line symmetrically polygonal or curved surface shaped along the central axis α of torsional deformation of the hinge part 14 as their axis of symmetry enables the micro mirror apparatus to widen more effectively its servo band.

What is claimed is:

1. A micro mirror apparatus comprising:
   a stationary part;
   a movable part connected to said stationary part through a hinge part; and
   a reflecting surface formed on said movable part;
   said movable part pivoting on said hinge part as its axis by torsional deformation of said hinge part,
   wherein on at least a part of said hinge part a protrusion protruding in the direction of its thickness is formed.

2. The micro mirror apparatus according to claim 1 wherein said protrusion is formed along the central axis of torsional deformation of said hinge part.

3. The micro mirror apparatus according to claim 1 wherein said protrusion is formed over the entire area between said stationary part and said movable part.

4. The micro mirror apparatus according to claim 1 wherein said protrusion is formed on both the upside and downside of said hinge part.

5. The micro mirror apparatus according to claim 1 wherein said protrusion is formed on either the upside or the downside of said hinge part, and accordingly the cross section of the hinge part in the thickness direction at the point where said protrusion is formed is quasi semicircular or quasi semielliptic.

6. The micro mirror apparatus according to claim 4 wherein said protrusion is formed on both the upside and the downside of said hinge part, and accordingly the cross section of the hinge part in the thickness direction at the point where said protrusion is formed is quasi circular or quasi elliptic.

7. A micro mirror apparatus comprising:

a stationary part;

a movable part connected to said stationary part through a hinge part; and a reflecting surface formed on said movable part;

said movable part pivoting on said hinge part as its axis by torsional deformation of said hinge part, wherein at least one of the edge connected to said stationary part of said hinge part or the edge connected to said movable part is made line symmetrically polygonal or curved surface shaped with respect to the central axis of torsional deformation of said hinge part as its axis of symmetry.

8. An optical disk apparatus for recording and/or reproducing information on an optical disk by irradiating light emitted from the light source onto the optical disk, comprising:

a micro mirror apparatus that reflects the light emitted from said light source and irradiate the same onto said optical disk;

said micro mirror apparatus comprising a stationary part, a movable part connected to said stationary part through a hinge part, and a reflecting surface formed on this movable part, said movable part pivoting on said hinge part as its axis by torsional deformation of said hinge part and shifting the position of the light spot reflected by said reflecting surface and irradiated on said optical disk;

on at least a part of said hinge part a protrusion protruding in the direction of its thickness being formed.

9. An optical disk apparatus for recording and/or reproducing information on an optical disk by irradiating light emitted from the light source onto the optical disk, comprising:

a micro mirror apparatus that reflects the light emitted from said light source and irradiate the same onto said optical disk;

said micro mirror apparatus comprising a stationary part, a movable part connected to said stationary part through a hinge part, and a reflecting surface formed on this movable part, said movable part pivoting on said hinge part as its axis by torsional deformation of said hinge part and shifting the position of the light spot reflected by said reflecting surface and irradiated on said optical disk;

at least one of the edge connected to said stationary part of said hinge part or the edge connected to said movable part being made line symmetrically polygonal or curved surface shaped along the central axis of torsional deformation as its axis of symmetry.

* * * * *